Dec. 30, 1930.  E. J. MADDEN  1,786,912
VEHICLE BRAKE
Filed Oct. 21, 1927  3 Sheets-Sheet 1
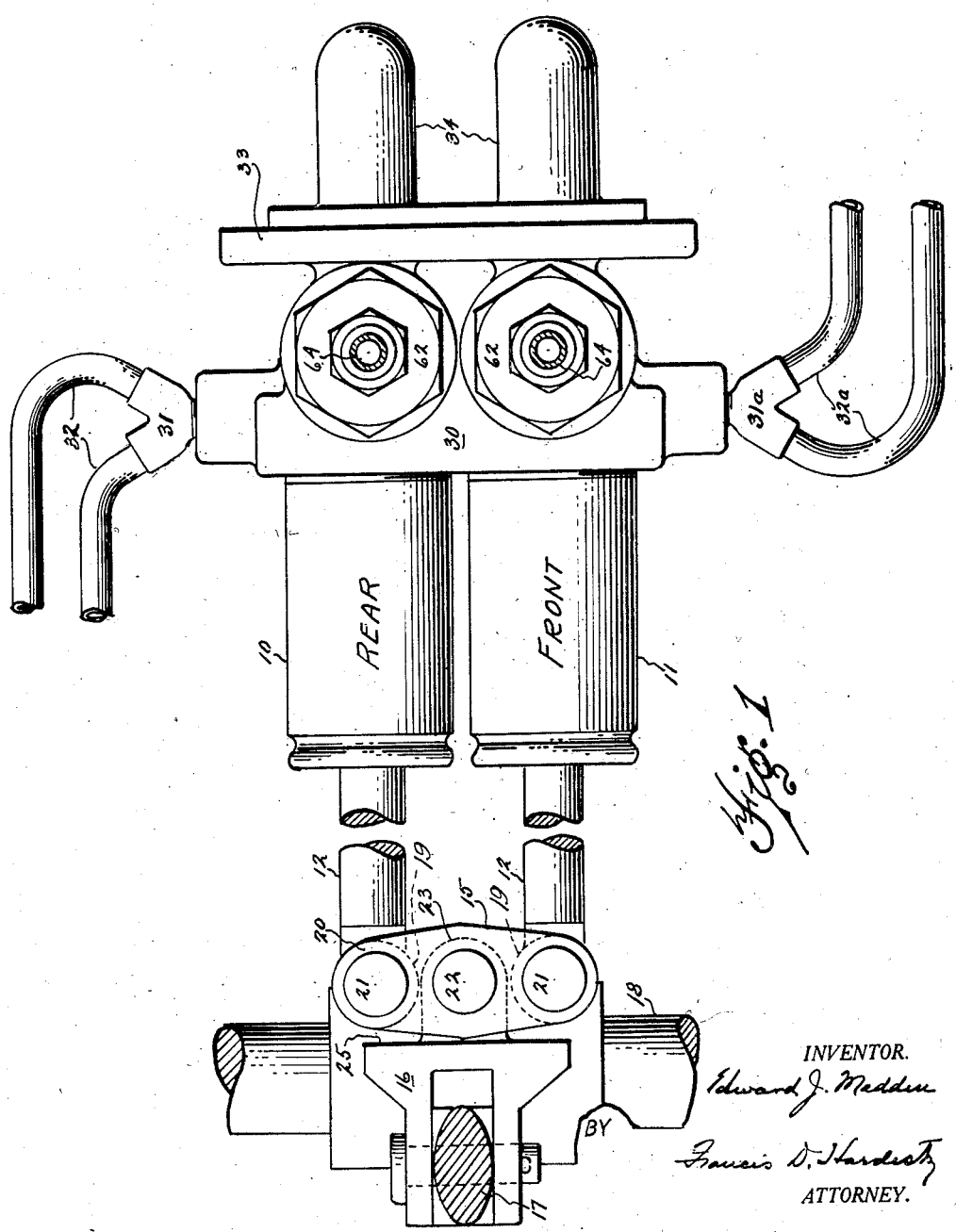
INVENTOR.
Edward J. Madden
BY
Francis D. Hardesty
ATTORNEY.

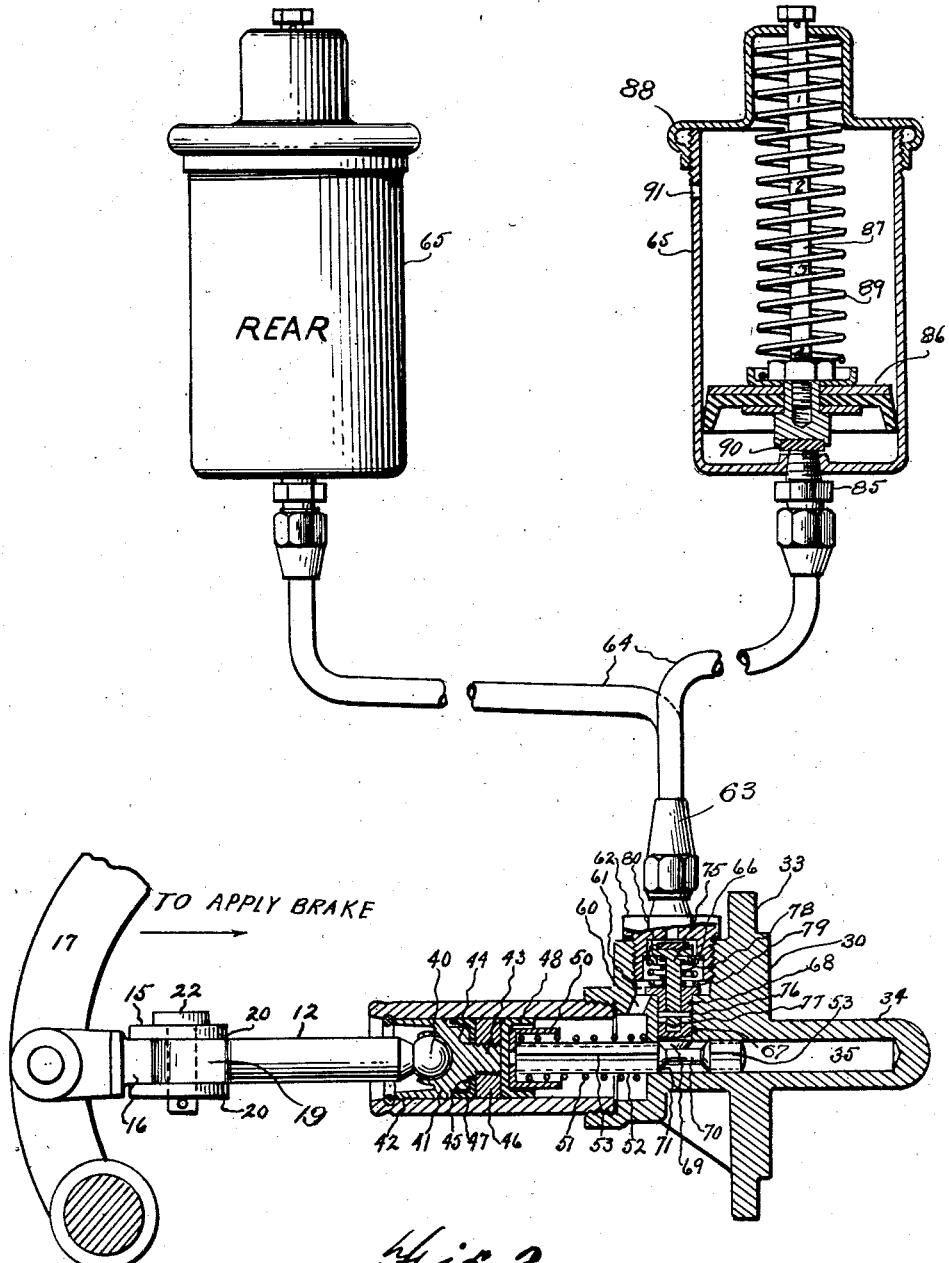

Dec. 30, 1930.   E. J. MADDEN   1,786,912
VEHICLE BRAKE
Filed Oct. 21, 1927   3 Sheets-Sheet 3
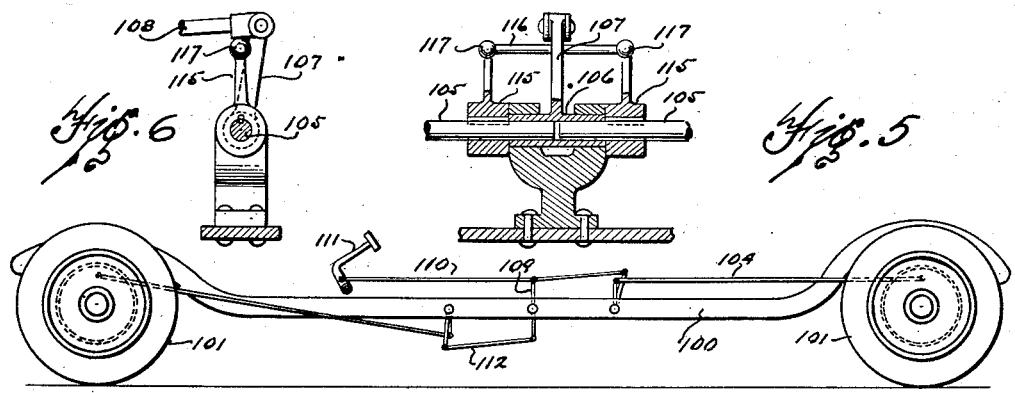
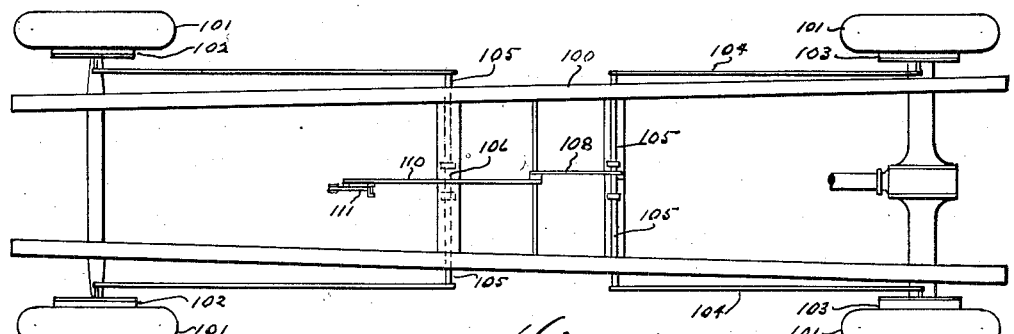
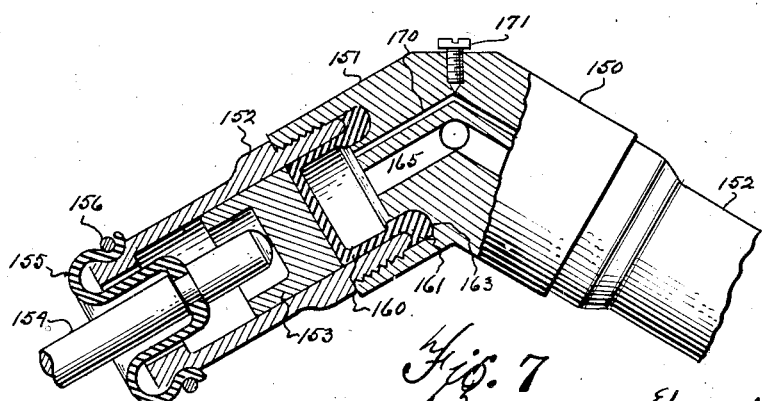
INVENTOR.
Edward J. Madden
BY Francis D. Hardesty
ATTORNEY.

Patented Dec. 30, 1930

1,786,912

UNITED STATES PATENT OFFICE

EDWARD J. MADDEN, OF DETROIT, MICHIGAN

VEHICLE BRAKE

Application filed October 21, 1927. Serial No. 227,712.

The present invention relates to vehicle brakes and more especially to the so-called "hydraulic" brakes, though certain features thereof are also applicable to mechanically operated brakes.

Heretofore in "four-wheel" brakes for vehicles, if of the hydraulic type, when a leak occurs in the system, all of the brakes become inoperative, and, if of the mechanical type, when one brake becomes disconnected, the three remaining brakes become a dangerous combination.

Among the objects of the present invention therefore is to overcome these very serious defects and thereby very greatly increase the safety of the braking system.

A further object is to improve the automatic replenishing of the liquid in the hydraulic system.

A further object is to decrease the tendency of certain parts of the system to leak.

Still other objects will readily occur to those skilled in the art upon reference to the following description and accompanying drawings in which:—

Fig. 1 is a plan view of the master cylinders of a hydraulic type of brake;

Fig. 2 is a side view of the same and the reserve tanks with one of the cylinders and one of the tanks in vertical section;

Fig. 3 is a diagrammatic view in side elevation showing one of the principles of the invention as applied to mechanical brakes;

Fig. 4 is a plan view of the same;

Fig. 5 is a transverse vertical section through one of the equalizers, therefor;

Fig. 6 is a view from the right of the parts shown in Fig. 5, and

Fig. 7 is a partial section of one of the brake cylinders.

As indicated in Figs. 1, 2 and 7, the hydraulic system comprises a pair of master cylinders 10 and 11 the pistons of which are operable by the piston rods 12 pivotally connected at their outer ends to a balancer 15, which in turn is pivotally connected to a link 16, connected to the brake pedal 17 carried on shaft 18. The piston rods 12 will each be provided with an eye 19 adapted to lie between plates 20 forming the balancer 15 and secured thereto by the pins 21 passing through the plates and eyes. Plates 20 are pivoted to link 16 by means of pin 22 which passes therethrough and through the tongue 23 on the link. Immediately in front of the balancer 15, the link 16 is provided with a wide shoulder 25 which prevents more than a very limited movement of the balancer 15 for a purpose to be described.

Each cylinder (10 or 11) consists of a cylinder barrel screwed into or otherwise connected to a head member 30 provided with side outlets into which are screwed branching nipples 31 and 31a having tubes 32 and 32a connected thereto and leading each to one of the brakes. This head member 30 is further provided with a flange 33 by means of which it may be mounted securely. There is also an extension 34 coaxial with each cylinder and bored out as at 35.

In each cylinder is a piston connected by a ball and socket joint 40 to a connecting rod 12. These pistons consist of a body portion 41, including the socket of joint 40, and provided with a skirt portion 42 at its outer end. The inner end of body 41 terminates in a reduced threaded shank 43 having a narrow shoulder 44 at the end of the threads and has a wide shoulder 45 of somewhat smaller diameter than the main body. Upon shank 43 is screwed a cylindrical nut 46 and a rubber cup 47 is held on shoulder 45 by means of this nut.

The nut 46 and shank 43 are so proportioned that when screwed together the inner surface of the two is substantially smooth and against such surface is placed a second rubber cup 48, completing the piston and rendering it liquid tight in both directions.

In order to maintain cup 48 tightly against the piston proper and in order to limit the inward stroke of the piston so that the cup 48 can not pass out of the cylinder 10 (or 11), a spacing cup or thimble 50, of somewhat smaller diameter than the cup, is pressed against the cup by a spring 51 and a guide rod 52 secured to said cup prevents lateral displacement thereof and carries the spring 51.

The rod 52 is grooved, as at 53, and slides into bore 35 of the extension 34 as a guide therefor, the grooves 53 permitting displaced liquid to escape into the cylinder proper.

Refilling of the cylinders is provided for by providing a passage 60 from a cylinder into a small chamber 61 in the upper part of the head member 30. Into each chamber 61 is screwed a cap 62 to which is secured a nipple 63 connected to a pipe 64 leading to a reserve tank 65, one for each cylinder.

Each cap 62 is bored out and counterbored to provide a shoulder 66 and each chamber 61 is provided with an axial opening 67 leading into the bore 35 and in each opening 67 is the stem 68 of a valve. The valve stem 68 is beveled at its lower end 69 and rod 52 is reduced as at 70 and at the end of the reduced portion provided with a cam surface 71 adapted to lift the valve upon movement of said rod into the extension 34.

Telescoping into the stem 68 is a second valve member 75 having its movement relative to stem 68 limited by a pin 76 coacting with slots 77 in stem 68 while a light spring 78 tends to keep the member 75 at the upper limit of this relative movement. The upward movement of stem 68 is resisted by a spring 79 between its upper surface and a washer 80 seated on shoulder 66.

The structure of the reserve tank 65 is comparatively simple. Each tank consists of a cylindrical cup with a central opening in its bottom through which passes the nipple 85 connecting pipe 64 and the inner end of the nipple is faced to form a valve seat. Within the cup is a piston 86 connected to a piston rod 87 adapted to extend out through the screw cap 88 and provided with a light spring 89 adapted to press down upon the piston. The under side of the piston is provided with a valve surface 90 adapted to seat upon the upper end of nipple 85 and stop the flow of liquid from the tank.

It is prefered to provide each tank with an opening 91 to limit the amount of liquid in filling, thereby providing a space for the entrance of piston 86.

The operation of the re-filling means would seem to be obvious from the description already given, but it should be noted that by means of the spring 89 a light pressure is exerted at all times on the reserve liquid and consequently, there is a positive flow from the tank 65 into the cylinder when the passage way is open, as it will be when the piston 41 is at the outer end of its travel. However, as soon as the piston 41 moves toward the right, as in Figure 2, the cam surface 71 on the rod 52 immediately lifts the valve stem 68 and thereby lifts the valve member 75 to close off the passage at the lower end of the pipe 64 and prevent back flow of liquid from the cylinder to the reserve tank. The valve member 75 is permitted a certain relative movement with the stem 68 in order that it may not require too accurate a proportioning of the parts and insure proper closing of the valve.

The installation which has been described with reference to the hydraulic type of brake permits the operation of one pair of brakes entirely independent of the other pair in a four-wheel brake system but provides equal pressure on both systems as long as both are working correctly. A slight variation in pressure in the two cylinders 10 and 11 will be taken up by the balancer 15, but if anything should happen to one pair of brakes so that it becomes inoperative, the balancer 15, through its limited movement, permits the normal operation of the other pair of brakes and thereby makes for greater safety than the conventional brake system. In fact, the present system provides means whereby if all of the fluid leaks out of one side of the system, the other side will still be intact and operative.

As stated above in the objects of the invention, the same principle is applicable to mechanically operated brakes and a diagrammatic showing of such mechanism is made in Figures 3 to 6 inclusive.

In these figures, the frame of an automobile is indicated at 100 and the four wheels by 101. Each front wheel is provided with a brake 102 and each rear wheel with a brake 103. The brakes 103 are shown as operated through links 104 in turn actuated by cross shafts 105. The cross shafts 105 are separate shafts and are aligned with their inner ends adjacent within a sleeve 106. This sleeve 106 has fixed thereto an arm 107 which through a link 108 is connected to the upper end of a lever 109 and through a link 110 connected to pedal 111. The lower end of the lever 109 is connected through a link 112 through a similar arrangement to the front brakes 102.

Referring to Figure 5, it will be noted that the shafts 105 have keyed to their inner ends operating levers 115 which normally are in the same plane. The upper ends of these levers 115 are connected together by a rod 116 and where the rod 116 connects to the lever 115 is a ball joint 117. This rod 116 is located in the path of the arm 107 so that when the latter is moved it carries with it the rod 116 and both arms 115, thereby rotating shafts 105 and applying the brakes connected thereto.

It will be readily seen that the operation of the pedal 111 will through lever 109 actuate both arms 107 and apply all four of the brakes, but in case one of either pair of brakes becomes inoperative through the breakage of a part or the disconnecting of some element, the other member of the pair also becomes inoperative. In such case, the operator of the vehicle may proceed with comparative safety because the other pair of brakes remain in operative condition.

Referring again to the hydraulic type of brake, Figure 7 shows a new form of brake cylinder which is particularly suitable for the present system.

In this figure, a double cylinder 150 having its parts at an angle is located within the brake drum and adapted to actuate the brake bands against said drum (the band and drum not being shown). The cylinder consists of a header portion 151 having screwed therein the two cylinders 152. In each cylinder is a metal piston 153 adapted when moved to force outwardly the piston rod 154, for the application of the brakes. A boot 155 surrounding rod 154 and secured over the outer end of the cylinder by a ring 156 is provided to prevent entry of dirt.

Within each cylinder 152 behind the piston 153 is a rubber cup member 160. This member consists of a cup portion with a heavy flange 161 which is firmly held between the inner end of cylinder 152 and a suitable seat 163 in the header member 151. This cup 160 covers the liquid inlet 165 and is expanded by forcing in the liquid from the brake system and takes the place of the conventional rubber member movable with the piston.

In Figure 7 the bleeder passage is indicated at 170 and the valve therefor at 171.

It should be noted that the piston guide rods 87 in tanks 65 may be graduated as shown, to indicate the amount of liquid remaining in each reserve tank and thus furnish a visible indication of the improper functioning of either pair of brakes when this occurs. Unequal quantities of liquid in the tanks would of course indicate a leakage of one side of the system. Further, these tanks may be marked as indicated so as to show which pair of brakes is faulty.

Now having described the invention and the preferred form of embodiment thereof, it is to be understood that the said invention is to be limited, not to the specific details herein set forth and illustrated, but only by the scope of the hereunto appended claims.

I claim:—

1. In hydraulic vehicle brakes, a master cylinder, a piston therein, movable to actuate the brakes, a reserve tank, a conduit from said tank to said cylinder, means for causing a flow of liquid from said tank to said cylinder, and a valve actuated by said piston to close said conduit with the initial movement of said piston, said means including a valve for closing said conduit when said tank is substantially empty.

2. In hydraulic vehicle brakes, a master cylinder, a piston therein, movable to actuate the brakes, a reserve tank, a conduit from said tank to said cylinder, means for causing a flow of liquid from said tank to said cylinder, and a valve actuated by said piston to close said conduit with the initial movement of said piston, said means including a spring pressed piston having on its underside a valve adapted to close said conduit when said tank is substantially empty.

3. In hydraulic vehicle brakes, a master cylinder, a piston therein movable to actuate the brakes, a reserve tank, a conduit from said tank to said cylinder, means for forcing liquid to flow from said tank to said cylinder, a valve operable to close said conduit and having a stem portion, a cam member carried by said piston, and acting on said stem to close said valve during initial movement of said piston.

4. In hydraulic vehicle brakes, a master cylinder, a piston therein movable to actuate the brakes, a reserve tank, a conduit from said tank to said cylinder, means for forcing liquid to flow from said tank to said cylinder, a valve for closing said conduit against liquid flow, means carried by said piston to actuate said valve to close said conduit during initial movement of said piston, a second valve in said conduit operated by said liquid forcing means and adapted to close said conduit when said tank is substantially empty.

5. In hydraulic vehicle brakes, a master cylinder, a piston therein movable to actuate the brakes, a reserve tank, a conduit from said tank to said cylinder, means for forcing liquid to flow from said tank to said cylinder, a valve for closing said conduit against liquid flow, means carried by said piston to actuate said valve to close said conduit during initial movement of said piston, a second valve in said conduit operated by said liquid forcing means and adapted to close said conduit when said tank is substantially empty, said forcing means being provided as the means to indicate the amount of liquid in said tank.

EDWARD J. MADDEN.